May 27, 1958 A. MEULNART 2,836,375
FISHING REEL
Filed March 26, 1956
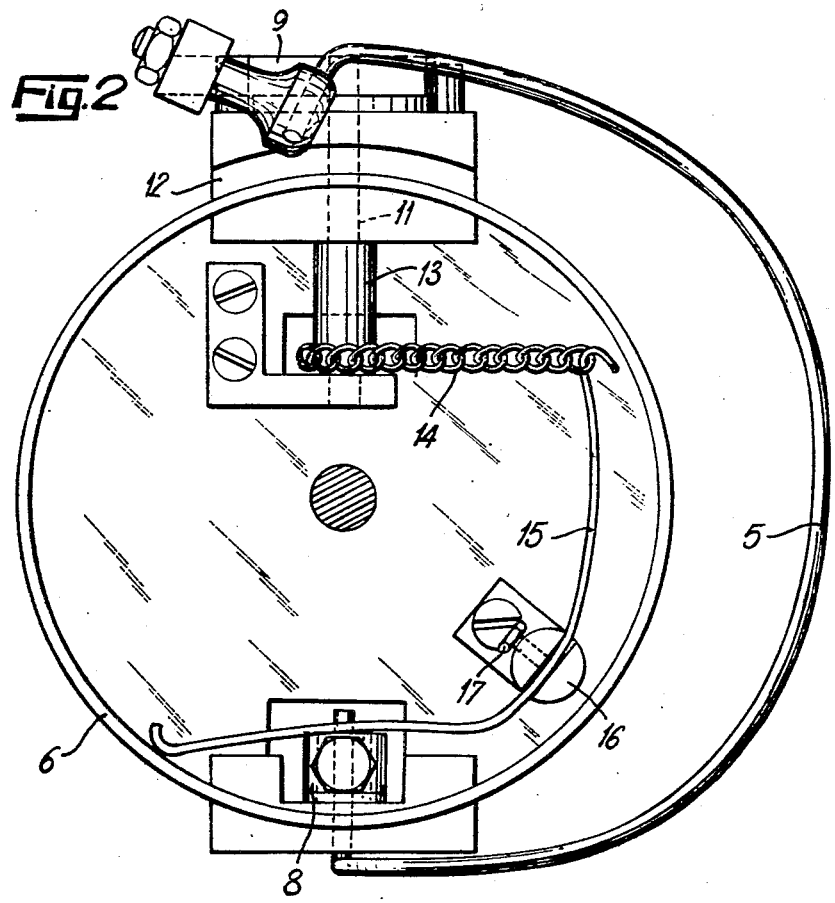
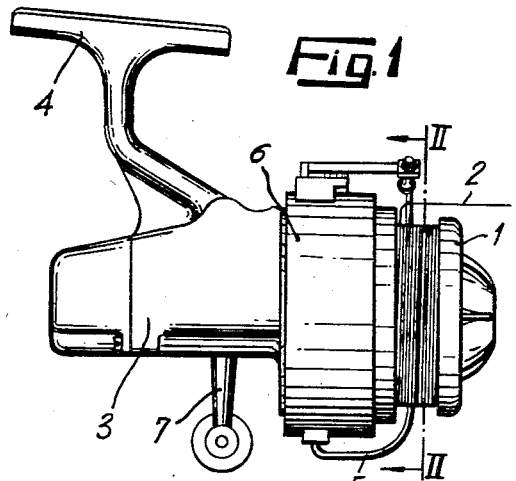
INVENTOR
ANDRÉ MEULNART
BY Reynolds, Beach & Christensen
ATTORNEYS

United States Patent Office 2,836,375
Patented May 27, 1958

2,836,375

FISHING REEL

André Meulnart, Saint Cloud, France

Application March 26, 1956, Serial No. 573,688

Claims priority, application France January 11, 1956

4 Claims. (Cl. 242—84.2)

The present invention relates to fishing reels of the so-called stationary or non-rotary line drum type and, more particularly, to the control device for closing the pick-up loop of such reels, that is, for moving the loop into the plane of the drum.

Usually, in this type of reel the pick-up is constituted by a loop, both ends of which are bent in alignment and are adapted to pivot chordwise (which chord as a rule is a diameter) of the rotary take-up drum. Most of the time, the pick-up is urged to closed or operative position by a coil spring wound about a shaft rigid with one of the bent end portions of the pick-up. When the spring breaks and should be replaced, it is necessary, therefore, to dismount the pick-up. Furthermore, the initial stress of the spring may not be modified readily.

The object of the present invention is to provide a reel of the aforesaid type which has not the drawbacks hereinabove stated.

For this purpose, according to the main feature of the invention, the pick-up carried by the rotary drum is resiliently urged to closed position by a spring which is wholly separate from the shaft, connected on one hand to said rotary drum, and, on the other hand, to one end of a practically non-elastic chain or like flexible tension member, the other end of which is hooked to and wound around a shaft which is fixed to one of the ends of the pick-up and which is journalled in said rotary drum. The chain is readily disconnectible from the spring and from the rotary drum for adjustment of the spring force, and the spring, upon disconnection of the chain, is readily removable and replaceable, and adjustable as to its stress.

By using a small chain as the tension member, any link thereof can be engaged with the shaft, or with the spring, to regulate the spring force.

According to a further feature of the invention, the spring is a leaf spring threaded in a yoke piece in an adjustable position in order that the active length of the spring standing out of said yoke-piece may be varied at will for adjusting the original stress of the spring.

Other objects and advantages of the invention will be apparent to those skilled in the art, from a consideration of the following description of one specific embodiment of the invention, shown by way of example, in the accompanying drawing in which:

Fig. 1 is a side view of a fishing reel and

Fig. 2 is, on a larger scale, a section taken along the line II—II of Fig. 1, but with the stationary drum omitted.

Referring to the drawing, there is seen a reel for casting, of the so-called stationary drum 1 type, on which is wound a line 2. The drum 1 is carried by the casing 3 of the apparatus having a bracket 4 adapted to be fastened to the fishing rod adapted to carry the reel. Winding the line is effected by means of a take-up device, or pick-up comprising a loop 5 both end portions of which are bent in alignment and are adapted to pivot on a geometrical axis forming a chord (often a diameter) of a rotary cylindrical take-up drum.

The take-up drum 6 is mounted coaxially with the stationary drum 1 on the casing 3 of the apparatus, both drums being adjacent each other, but spaced sufficiently to define a shallow chamber, wherein are the loop-controlling mechanisms later described. By means of a crank 7, the shaft of which is mounted in the casing 3, the take-up drum 6 and loop 5 carried thereby may be rotated through any suitable transmission (not shown) arranged within the casing 3, according to a well-known arrangement which is no part of the invention.

One of the bent ends of the pick-up 5 is journalled in the wall of the rotary drum 6 and is retained by a collar 8 with a set screw whereas its other end is rigid with a lever 9 carried by a shaft 11 rotatably mounted in a boss 12 of the rotary drum 6 and which has an enlarged portion 13 adapted to position the shaft in axial direction and on which is wound one end of a small chain 14.

The end of the portion of the chain 14 wound around the shaft 13 is hooked to said shaft for instance by means of a small hook (not shown) driven into said shaft. The other end of the chain is hooked at one end of a leaf spring 15 held in place in a slotted stud or yoke-piece 16 by means of a set screw 17, the opposite end of said leaf spring bearing against the inner wall of the rotary drum 6.

The arrangement is such that the spring 15 urges the shaft 13 to rotate in the direction which brings the pick-up back into closed or operative position encircling the drum 6, which is that shown on the drawing.

The apparatus comprises, moreover, a stop device of any suitable conventional type (not shown) adapted temporarily to retain the pick-up in open or inoperative position remote from the drum 6 and which releases the latter as soon as the drum 6 is rotated by means of the crank 7.

The operation of the apparatus which has just been described will be readily understood:

Every time the pick-up is urged into open position, the chain 14 winds around the shaft 13 and therefore additionally stresses the spring 15 to which it is attached. Conversely, as soon as the stop device holding the pick-up in open position is released, the latter is suddenly returned to closed position under the action of the spring 15 which pulls the chain so that the latter is partially unwound from the shaft 13.

This assembly may be readily mounted, and in case the spring should break, it may be easily replaced upon removal of the stationary drum 1 alone, and without it being necessary to dismount the pick-up, an operation which it is not possible to carry out in reels of known design. Furthermore, the original stress of the spring may be readily adjusted, either by shifting the spring in the yoke piece, or by hooking the hook of the shaft 13 in another link of the chain. This chain, as a flexible tension member, has the advantage of constituting a connection both ends of which may be easily hooked at each of different links, on the spring and on the shaft 13 respectively. Such simplicity of repair and adjustment is of great advantage to a user with cold hands, as is usually the case when the reel is in use.

As many changes could be made in the above construction and many widely different embodiments of this invention could be made without departing from the scope of the claims, it is intended that all matter contained in the above description or shown in the accompanying drawing, shall be interpreted as illustrative and not in a limiting sense.

What I claim is:

1. In a fishing reel, in combination, a non-rotary line-receiving drum, a rotary drum coaxial therewith and spaced slightly axially therefrom to define a shallow chamber, accessible by separation of said drums, a shaft journalled in and directed chordwise of said rotary drum, within said chamber, a line pick-up loop formed with two substantially coaxial ends, and with an intervening portion of a shape to encircle a portion of said drums, one loop end being secured rigidly to and coaxially of said shaft, and the other being journalled in the opposite side of said rotary drum, coaxially of said shaft, spring means within said chamber mounted upon and rotatable with said rotary drum, and located distantly from said shaft, and a flexible, non-elastic tension member within said chamber releasably interconnected between said spring means and said shaft, and wound partially about the latter in the sense to urge the loop into a plane transverse of the shaft, and to further stress the spring upon departure of said loop from the plane.

2. A fishing reel according to claim 1, wherein said flexible non-elastic tension member is a small chain.

3. A fishing reel according to claim 1, wherein the spring means includes a yoke-piece carried by said rotary drum and a leaf spring slidably secured in said yoke-piece so that the length of said spring projecting from said yoke-piece is adjustable, for effecting adjustment of the initial stress of said spring.

4. A fishing reel according to claim 3, wherein said leaf spring is engaged in said yoke-piece at a point of said spring intermediate its ends, one end of said spring bearing against said rotary drum and the other end thereof being removably attached to said tension member.

References Cited in the file of this patent

UNITED STATES PATENTS

| 2,599,189 | Mauborgne | June 3, 1952 |
| 2,762,579 | Mauborgne | Sept. 11, 1956 |

FOREIGN PATENTS

| 899,878 | Germany | Dec. 17, 1953 |